INVENTOR.
HARRY J. BURNS
BY
LeRoy J. Leishman
AGENT

Sept. 13, 1966   H. J. BURNS   3,272,201
HYDROTHERAPY DEVICE FOR ANIMALS
Filed Jan. 31, 1964   3 Sheets-Sheet 2
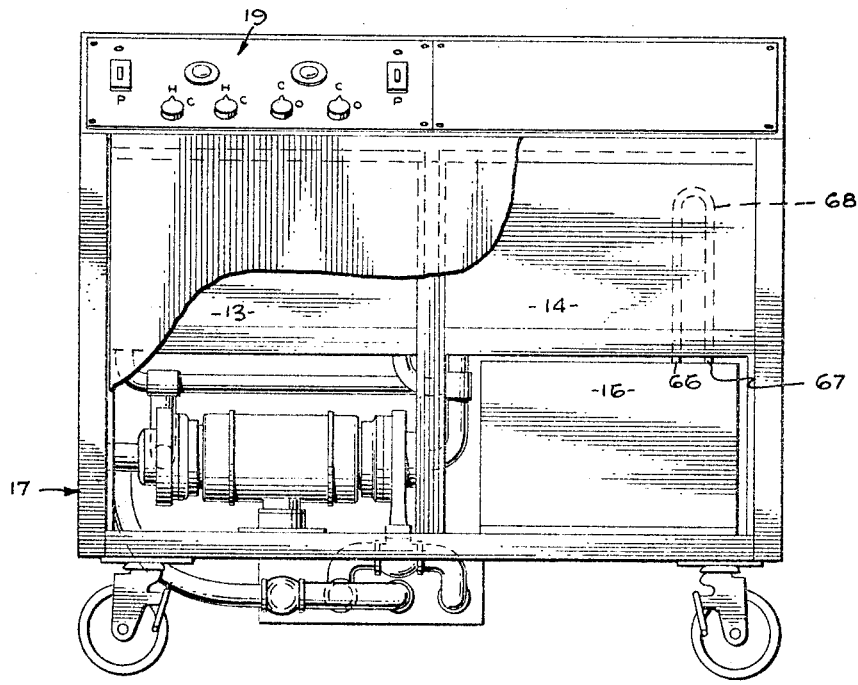
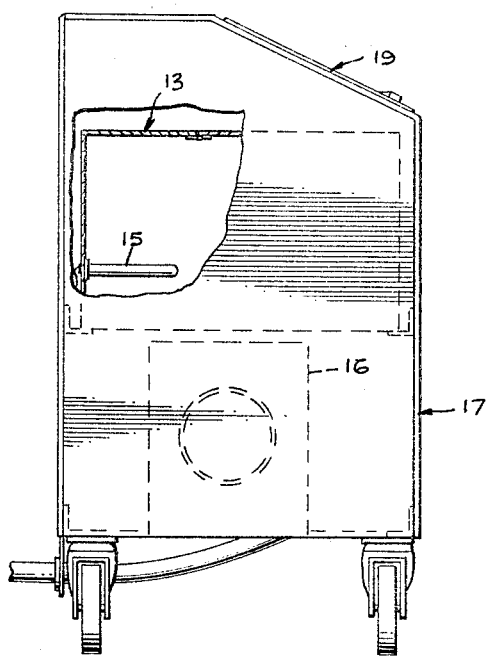
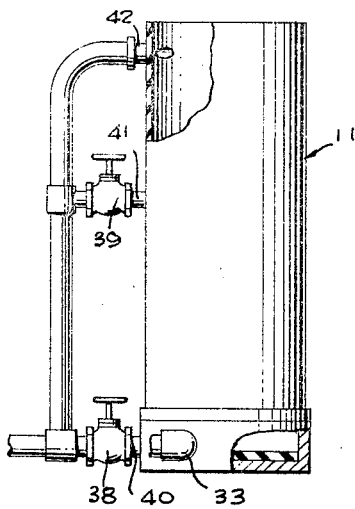
INVENTOR.
*Harry J. Burns*
BY
*LeRoy J. Leishman*
AGENT

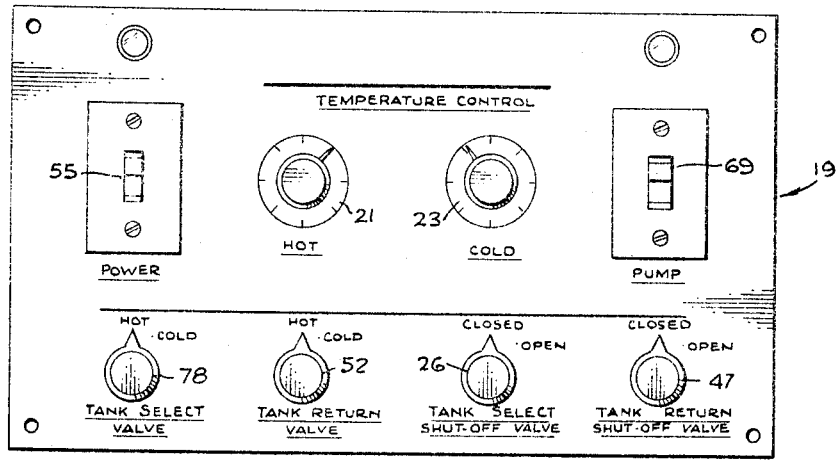
Fig. 6
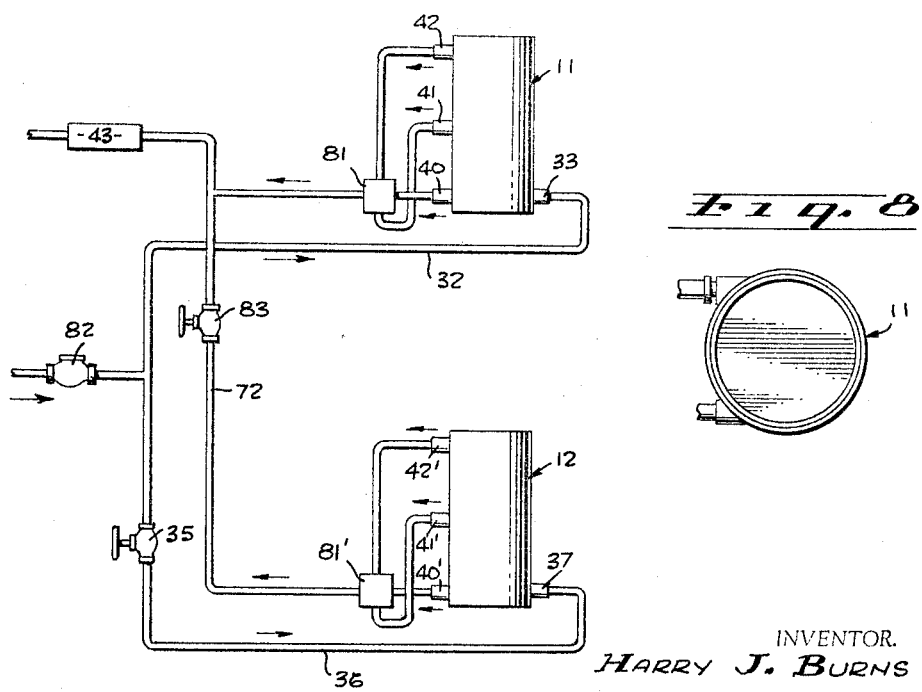
Fig. 5
Fig. 8
INVENTOR.
HARRY J. BURNS
BY
LeRoy J. Leishman
AGENT

United States Patent Office 3,272,201
Patented Sept. 13, 1966

3,272,201
HYDROTHERAPY DEVICE FOR ANIMALS
Harry J. Burns, Anaheim, Calif., assignor of one-half to Martin Fallon, Jr., Louisville, Ky.
Filed Jan. 31, 1964, Ser. No. 341,574
19 Claims. (Cl. 128—66)

The invention herein described relates to equipment for giving hydrotherapy treatment to the limbs of persons, horses or other animals, and more particularly to an assembly embodying one or more boots, each adapted to receive the lower portion of a horse's leg, and to equipment for circulating water of a predetermined temperature through such boot or boots.

It has been found that rapidly circulating water passing through such boot massages the limb that may be placed therein, and that by controlling the temperature of the water for specialized treatments, the horse is materially benefited. Sprains, sores and bruises recover more quickly under such treatment than without, and the horses definitely enjoy receiving the treatment and whinny at the sight of the boots when a subsequent treatment is undertaken after the horse has had an initial experience.

A principal object of the invention is to provide vessels or boots for receiving one or more of the limbs of an animal and to conduct water at a predetermined temperature between such boot and a mobile control unit containing apparatus for shutting the water off or turning it on and for controlling its temperature.

Another object is to make the equipment independent of any commercial water system by including water tanks in a mobile control unit or console.

A further object is to provide an assembly of equipment of the type describing having a hot water tank as well as a cold water tank, in each of which the water may be kept at a predetermined temperature, and to afford controls on the operating panel of the console whereby water may be selectively released from either one of the tanks and fed into the boot or boots.

An additional object is to provide the boot or boots with means whereby the water in the boot may be maintained at a predetermined level while it circulates in and out of the boot.

Still another object is to provide pumps in the system for keeping the water in circulation.

Another object is to provide a console for such equipment to house the hot water and cold water tanks, as well as the necessary pumping means.

A further object is to provide a water circulating system that will include a strainer or filter so located that hairs, dirt or other material entering the water at the boot will be eliminated before the water returns to the pump.

Yet another object is to provide controls on an operating panel of the console not only for turning the water on or off at either of the tanks but also for preselecting the temperature of the water in each of the tanks.

This invention possesses many other advantages, and has other objects which may be made more clearly apparent from a consideration of an illustrative embodiment of the invention. Such an embodiment is shown in the drawings and is described in the specification. This embodiment, however, is merely illustrative, and it is to be understood that the following detailed description is not to be taken in a limiting sense, since the scope of the invention is best defined by the appended claims.

In the drawings:

FIG. 3 is a front view of the mobile console, showing the instrument panel whereby the equipment may be operated and controlled, the console being partly broken away to show the pumping means and certain of the water conduits;

FIG. 4 is a left side view, partly broken away, of the console shown in FIG. 3;

FIG. 5 illustrates a modification of a portion of the equipment shown in FIG. 2;

FIG. 6 is a plan view of the instrument panel of the operating console;

Figure 1:
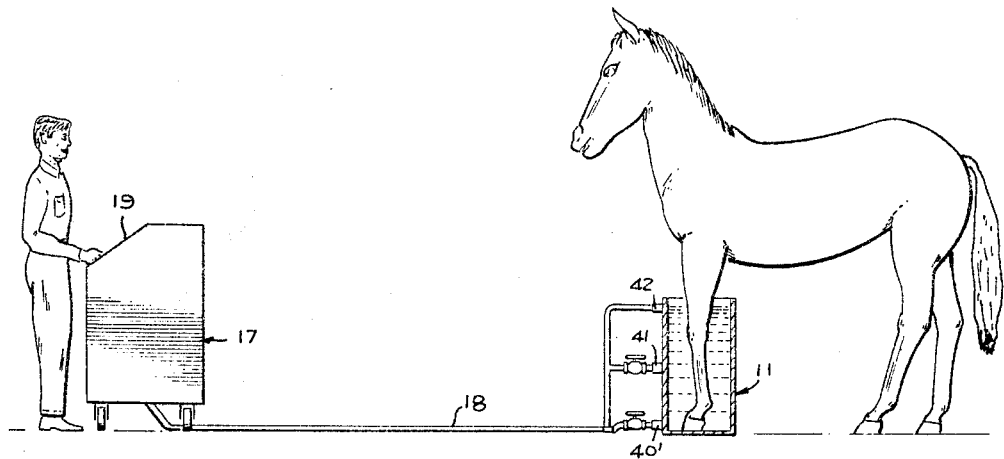
FIGURE 1 is a general view of one embodiment of my invention showing a horse receiving a hydrotherapeutic treatment, one of the legs of the horse being shown inside of a treatment boot connected by suitable tubing with the operating console where controls may be adjusted by an attendant while he watches the horse.

FIG. 7, on the second page of the drawing, is a side elevation of one of the treatment boots showing one arrangement of valves for controlling the release of water from the boot at predetermined levels; and FIG. 8 is a top view of one of the boots.

Figure 2:
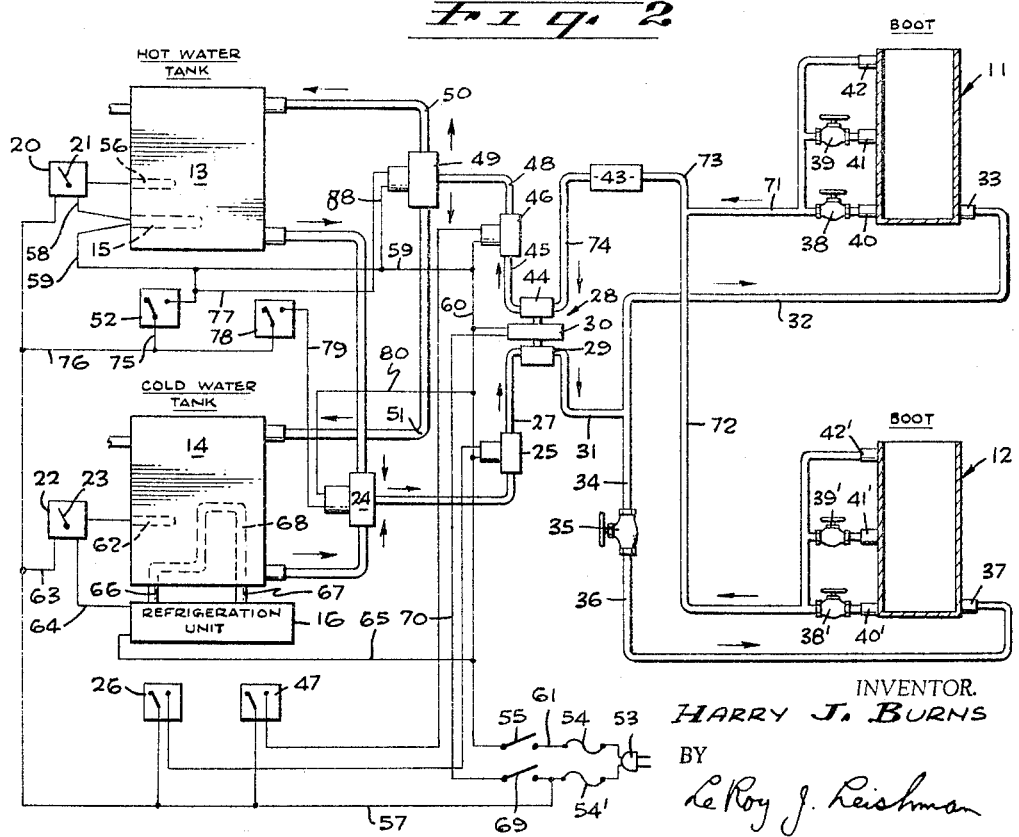
FIG. 2 is a diagrammatic illustration of the complete water heating and circulating system, together with a schematic diagram of suitable electric circuits for operating the same.

A general understanding of the invention may perhaps be most readily obtained by referring to FIG. 2, where boots 11 and 12 are shown connected by means of suitable conduits, tubes, valves and other intermediate components to a hot water tank 13 and a cold water tank 14. The contents of the hot water tank 13 may be kept at a desired temperature by means of the thermostatically controlled heating element 15, and the water in the cold water tank may be kept at the desired temperature by means of the thermostatically controlled refrigeration unit 16. Further details of these controls will be described after various general features of the entire assembly have been discussed.

Aside from the boots 11 and 12, their control valves and the flexible tubing 18 (FIG. 1) all of the components of the equipment may be encased in the cabinet or console 17. The controls for these components in the console are located on the instrument panel 19, shown in FIGS. 1, 3, 4 and 6.

In addition to the aforementioned hot and cold water tanks 13 and 14, the console contains a refrigeration unit 16 and the necessary conduits and tubing to connect the various componets; and there are of course electrical conductors whereby the various valves and other components are connected to the operating controls on the instrument panel.

It is usually desirable that the water in the hot water tank be kept at approximately 135° F. and that the water in the cold water tank have a temperature of approximately 35° F. The thermostat 20 for the hot water tank (FIG. 2) is controlled by means of the indicator 21 (FIGS. 2 and 6); and the thermostat 22 for the cold water tank is similarly controlled by means of the indicator 23 (FIGS. 6 and 2). Details of the circuitry will be discussed after the general operation of the components has first been explained.

A three-way valve 24, preferably solenoid-operated, directs the flow of water from either of the two tanks 13 and 14 through a tank select shut-off valve 25, which is of course open whenever water from either of the tanks is flowing into the boots. This valve may be solenoid-operated by means of the control 26 on the instrument panel. From the valve 25 the water flows through conduit 27 to section 29 of the double action pump 28 which is powered by an electric motor 30. From section 29 of this pump the water flows through conduits 31 and 32 to the intake port 33 of boot 11, and also from conduit 31 to the associated conduit 34, valve 35, conduit 36, and intake port 37 of boot 12. During this filling operation, ports 40 and 41 of boot 11 are kept closed by means of valves 38 and 39 respectively, and the correspoding outlet ports 40′ and 41′ of boot 12 are similarly kept closed by means of valves 38′ and 39′ respectively. When these four valves are closed, the water will of course rise in the boots to the level of the top ports 42 and 42′, and will flow therefrom back toward the hot and cold water tanks by means of appropriate tubing later to be discussed. However, if it is desired to fill the boots only half full, the valves 39 and 39′ are opened so that the water will be drained off and returned to the tanks from the intermediate level without ever rising to the upper outlet ports 42 and 42′.

It is of course desirable that dirt, hair or other debris be removed from the water that is returning to the tank before it reaches the pump 28. Accordingly, a strainer 43 is interposed in the return tubing between the boots and the pump 28, as shown in FIGS. 2 and 5. When a double action pump is used, the water that leaves strainer 43 passes through section 44 of the pump and then through tube 45 to the tank return shutoff 46 which is normally open. This valve, like the others previously mentioned, may be solenoid-controlled. It is actuated by means of the tank return shutoff control switch 47 (FIGS. 2 and 6). When valve 46 is open, the water passes therefrom through tube 48 to the three-way tank return valve 49, which directs the water from this valve either through tube 50 to the hot water tank 13 or through tube 51 to the cold water tank 14. The three-way valve 49 may, like the others mentioned, be solenoid-operated by means of the manual switch 52 on the control panel.

In therapeutic treatments, it is often desirable to use cold water instead of hot or to alternate between the two, keeping the hot water in the boot for a given period of time and then changing to cold water, and perhaps repeating the cycle a few times. The equipment shown in the drawings is capable of the flexibility required for such treatments, and the manner of operating the controls for these purposes will be explained after some of the electrical components and circuitry have been described.

It is contemplated that most embodiments of the invention will be operated by alternating current at the voltages that are generally available, and that the equipment will be plugged into a local outlet, as by means of a plug 53 (FIG. 2). Current passes from this plug through the fuses 54 and 54′ and suitable conductors to the instrument panel 19 (FIGS. 1 and 6) upon which is mounted a main power switch 55, also shown diagrammatically in FIG. 2. This switch is of course turned to the on position in advance of the commencement of the treatment, as it obviously requires an interval of time for the water in the two tanks to reach the desired temperatures, this interval of course depending upon the size of the tanks and the efficiency of the heating element 15, and of the refrigeration unit 16. A sensor 56 in the tank for the hot water is appropraietly connected to the thermostat control 20. A conductor 57 leads from the fuse 54′ to various components including the temperature control 20 for the hot water tank. This thermostatic control of course opens and closes appropriate circuits which in this case consist of a conductor 58 leading from the control to the heating element 15 and a return conductor 59 leading from the heating element to conductor 60 that is connected directly to the main power switch 55. The other side of this switch is connected by means of conductor 61 to the other side of the power lines at the fuse 54.

After the power has been turned on by means of the master switch 55, the temperature control dials 21 and 23, for the hot and cold water tanks respectively, are set for the desired temperatures, which for some treatments is approximately 135° for the hot water and 35° for the cold. These dials of course adjust the thermostatic control units 20 and 22, shown diagrammatically in FIG. 2. The circuit has already been traced from the hot control thermostat to the hot water tank 15. Similar controls are of course provided for the cold water tank. This tank contains a sensor 62 appropriately connected to the cold water control thermostat 22. This thermostat is connected by conductor 63 to the power line 57 and by means of conductor 64 to the refrigeration unit 16. The motor (not shown) in this refrigeration unit is connected by conductor 65 to conductor 60 and to the other side of the power line through the main switch 55 (FIG. 2). Tubes 66 and 67 circulate the refrigerating medium from the refrigeration unit 16 to the cooling coil 68 inside of the cold water tank.

Before either hot or cold water can be circulated through the boots, the switch 69 (FIGS. 2 and 6) must of course be closed. Current then flows from this switch through conductor 70 to the motor, the other side of which is connected to the master switch 55 through conductor 60.

In a foregoing portion of this specification, it was stated that the three-way valve 24 directs the flow of water from either of the two tanks 13 or 14 through the tank select shutoff valve 25, and the flow of water from the latter valve was traced through other valves and various conduits to the boots 11 and 12 and thence back to one or other of the tanks. The aforementioned three-way valve 24 is solenoid-operated under the control of the switch 78 shown diagrammatically in FIG. 2 and designated numerically in FIG. 6 where the words "Tank Select Valve" appear beneath the control switch. In the schematic circuit diagram of FIG. 2, the movable arm or switch 78 is shown connected to conductor 76, which, in turn, is connected to conductor 57 that receives its power directly from switch 69. The other side of the switch 78 is connected by conductor 79 to the solenoid-control for the tank selector valve 24.

The switch 78 on the instrument panel is appropriately set so that either hot or cold water, as desired, will flow into the boots through the various valves and conduits hereinbefore discussed.

During the course of the treatment, the water flows from one or other of the aforementioned tanks into the boots and then back through the filter 43 and pump 28 to the tanks again, the treatment being completed either with hot or cold water, or with hot and cold water alternately for periods of time depending upon the nature of the treatment.

The tank return valve 49 must be set for returning the water either through the tube 50 to the hot water tank or through tube 51 to the cold water tank. This selection is made by means of the tank return switch 52 on the operating panel. One side of this switch is connected by conductors 75 and 76 to the power line 57 and the other side by conductor 77 to the solenoid which operates the tank return valve 49. The other side of the solenoid is connected by means of conductors 88 and 59 to the opposite power line 60.

Whenever it is desired to switch from the use of hot water to cold, or vice versa, this may be done in a very simple manner by appropriately turning the switches 52 and 78 on the instrument panel, shown in FIG. 6. This will select the tank from which the water will then be taken and the tank into which it will return.

After a treatment has been completed, or when the equipment is to be cleaned, the boots should be drained. If this is done at the end of a treatment, the motor may be kept running in order to pump the water out of the pumps, but if the draining is to be done between treatments when the motor will have been turned off, it must of course be turned on again by means of the motor switch 69. During this draining operation, the valves 38 and 38′ must be open so that water may be completely removed from the boots through the lower outlet ports 40 and 40′. The water will then flow from the boots through tubes 71 and 72 to the tube 73 and thence through the strainer 43 and then through section 44 of the pump 28, from whence it proceeds through tube 45 and the tank return shutoff valve 46 which obviously must be open. This is of course effected by means of the tank return shutoff switch 47 located on the operating panel. One side of this switch is connected to the power line 57 and the other side to the solenoid operating mechanism of the valve 46, the opposite side of which is connected to the main power line 60.

In FIG. 5 a modification in the conduit, tubing and valve arrangement is shown. When this system is employed, the valves 38, 38′, 39 and 39′ of the FIG. 2 embodiment are replaced by two four-way valves 81 and 81′. These may be operated by a local knob or handle, or suitable controls may be provided on the main operating panel on the console.

FIG. 5 also shows a flow regulator 82, which is optional, for controlling the flow of water into both of the boots through their respective inlet conduits 32 and 36. The modified arrangement shown in this figure also includes a valve 83 in the return line 72 so that boot 12 may be entirely removed from the system when boot 11 only is to be used.

Still other modifications may be made in the conduits, tubes, valves, controls and circuitry, and various components may be omitted and replaced by others performing the same function or the same function plus one or more additional functions, and parts may be rearranged, reversed or transposed—all without departure from the broad spirit of the invention as succinctly set forth in the appended claims.

I claim:

1. In hydrotherapy equipment for the limbs of animals: a boot for receiving a foot or hoof and at least part of the adjoining leg, said boot having a water inlet and at least one water outlet; a hot water tank; a cold water tank; a 3-way valve and conduits interposed between said tanks and inlet for selectively connecting said tanks to said inlet; tube means and valve means interposed between said outlet and said tanks for returning water from said at least one outlet to said hot water tank or said cold water tank optionally; and a pump interposed in said conduits for pumping water from said tanks to said inlet.

2. The combination of claim 1 in which said at least one outlet is located at a higher level than said inlet.

3. In hydrotherapy equipment for the limbs of animals: a boot for receiving the foot or hoof and at least a part of the adjoining leg, said boot having a water inlet and at least one water outlet; a hot water tank; a cold water tank; valve means and conduits interposed between said tanks and said inlet for selectively connecting said tanks to said inlet; a strainer or filter; means for conducting water from said outlet to said strainer or filter; means for conducting water from said strainer or filter selectively to one or other of said tanks; and pump means interposed between said tanks and said boot for circulating the water therebetween.

4. In hydrotherapy equipment for the limbs of animals: a pair of boots to accommodate two of an animal's limbs at the same time, each of said boots having a water inlet and at least one water outlet; a hot water tank; a cold water tank; a pump; conduits and valves interposed between said tanks and said inlets for selectively connecting said tanks to said pump; tubes for conducting the water from said pump to the inlets of said boots; and piping and water directing means interposed between said outlets and said tanks for selectively directing the water from said outlets to either of said tanks.

5. The combination of claim 4 with the addition of a strainer operatively interposed between said outlets and said water directing means for straining the water en route from said outlets to said water tanks.

6. In hydrotherapy equipment for the limbs of animals: a pair of boots to accommodate two of an animal's limbs at the same time, each of said boots having a water inlet and at least one water outlet; a hot water tank; a cold water tank; a first pump; conduits and valves interposed between said tanks and said first pump for selectively connecting said tanks to said first pump; tubes for conducting the water from said first pump to the inlet of said boots; a second pump; means for conducting the water from said outlets to said second pump; and valves and pipes interposed between said second pump and said tanks for delivering the water from said second pump selectively to said hot water tank or said cold water tank.

7. The combination of claim 6 with the addition of a filter operatively interposed between said outlets and said second pump.

8. In hydrotherapy equipment for the limbs of animals: a boot for receiving a foot or hoof and at least part of the adjoining leg, said boot having a water inlet, a first water outlet near the bottom of said boot and a second water outlet at a higher level than said first outlet; a hot water tank; a cold water tank; conduits and valves interposed between said outlets and said tanks for selectively connecting said tanks to said inlet; tubing and valves for returning water selectively from either of said outlets to said hot water tank or to said cold water tank; and a pump interposed in said conduits for pumping the water to said inlet.

9. The combination of claim 8 with the addition of a strainer interposed in said tubing for straining the water en route from said outlets to said tanks.

10. The combination of claim 8 with the addition of a second pump interposed in said tubing to facilitate the return of the water from said outlets to said tanks.

11. The combination of claim 9 with the addition of a second pump operatively interposed between said strainer and said tanks to facilitate the flow of water therebetween.

12. In hydrotherapy equipment for the limbs of animals: a boot for receiving a foot or hoof and at least part of the adjoining leg, said boot having a water inlet, a first water outlet near the bottom of said boot and a second and a third water outlet each at progressively higher levels than said first outlet; a hot water tank; a cold water tank; conduits and valves interposed between said tanks and inlet for selectively connecting said tanks to said inlet; tubing for returning water from said outlets to said tanks; a first drain valve interposed in said tubing between said first outlet and said tanks and acting when open to drain all the water from said boot into said tubing; a second drain valve interposed in the tubing between said second outlet and said tanks and acting when open and when the first drain valve is closed to release the water in said boot above said second outlet into said tubing; and a pump interposed in said conduits for pumping the water from said tanks to said inlet.

13. In hydrotherapy equipment for the limbs of animals: a boot for receiving a foot or hoof and at least part of the adjoining leg, said boot having a water inlet, a first water outlet near the bottom of said boot and a second and a third water outlet each at progressively higher levels than said first outlet; a hot water tank; a cold water tank; conduits and valves interposed between said tanks and said inlet for selectively connecting said tanks to said inlet; tubing means for returning water from said outlets to said tanks; a first drain valve interposed in said tubing between said first outlet and said tanks and acting when open to release all the water from said boot into said tubing; a second drain valve interposed in the tubing between said second outlet and said tanks and acting when open and when the first drain valve is closed to release the water in said boot above said second outlet into said tubing; a first pump operatively interposed in said conduits for pumping the water from said tanks to said inlet; and a second pump operatively interposed in said tubing to facilitate the return of the water from said outlets to said tanks.

14. In hydrotherapy equipment for the limbs of animals: a boot for receiving a foot or hoof and at least part of the adjoining leg, said boot having a water inlet and water egress means comprising at least one water outlet; a cabinet; a hot water tank mounted in said cabinet; a cold water tank mounted in said cabinet; conduits and valve means interposed between said inlet and said tanks for selectively connecting said tanks to said inlet; tubes and valves interposed between said egress means and said tanks for returning water from said egress means to said hot water tank or optionally to said cold water tank; and a pump mounted in said cabinet, said pump operatively interposed in said conduits for pumping water from said tanks to said inlet.

15. The combination of claim 1 with the addition of thermostatically controlled means for heating the water in said hot water tank; and thermostatically controlled means for keeping the water in said cold water tank at a predetermined temperature.

16. In hydrotherapy equipment for the limbs of animals: a boot for receiving a foot or hoof and at least part of the adjoining leg, said boot having a water inlet and a water egress means comprising at least one water outlet; a cabinet; a hot water tank mounted in said cabinet; a cold water tank mounted in said cabinet; conduits and valve means interposed between said inlet and said tanks for selectively connecting said tanks to said inlet; a first pump mounted in said cabinet and operatively interposed in said conduits for pumping water from said tanks to said inlet; tubing and valves interposed between said egress means and said tanks for returning water from said egress means to said hot water tank or optionally to said cold water tank; and a second pump operatively interposed in said tubing to facilitate the return of the water from said outlets to said tanks.

17. In hydrotherapy equipment for the limbs of animals: a boot for receiving a foot or hoof and at least part of the adjoining leg, said boot having a water inlet and a water egress means comprising at least one water outlet; a cabinet having at least one side wall that incorporates an instrument panel; a hot water tank mounted in said cabinet; a cold water tank mounted in said cabinet; conduits interposed between said tanks and said inlet and having a first valve therein for selectively connecting said tanks to said inlet, said first valve having a control mounted on said instrument panel; tubing interposed between said egress means and said tanks for returning water from said outlet to said tanks; a second valve interposed in said tubing for selectively directing the water returned through said tubing to said hot water tank or to said cold water tank, said second valve having a control mounted on said panel; and a pump mounted in said cabinet and operatively interposed in said conduits for pumping the water from said tanks to said inlet.

18. In hydrotherapy equipment for the limbs of animals: a boot for receiving a foot or hoof and at least part of the adjoining leg, said boot having a water inlet and water egress means comprising at least one water outlet; a cabinet having at least one side wall that incorporates an instrument panel; a hot water tank mounted in said cabinet; a cold water tank mounted in said cabinet; a first thermostatically controlled means for heating the water in said hot water tank; a second thermostatically controlled means for cooling the water in said cold water tank; a first control device on said instrument panel for preselecting the temperature to which said first thermostatically controlled means will heat the water in said hot water tank; a second control device on said panel for preselecting the temperature to which said second thermostatically controlled means will cool the water in said cold water tank; conduits interposed between said tanks and said inlet and having a first valve therein for selectively connecting said tanks to said inlet, said first valve having a control mounted on said instrument panel; tubing interposed between said egress means and said tanks for returning water from said outlet to said tanks; a second valve interposed in said tubing for selectively directing the water returned through said tubing to said hot water tank or to said cold water tank, said second valve having a control mounted on said panel; and a pump mounted in said cabinet and operatively interposed in said conduits for pumping the water from said tanks to said inlet.

19. The combination set forth in claim 18 in which the pump is electrically operated and to which said combination is added: a first electric switch on said panel for switching the current on or off to said electrically operated heating and cooling means and to said pump; and a second electric switch on said panel and electrically interposed between said first switch and said pump for switching said pump on or off independent of the heating or cooling means.

References Cited by the Examiner
UNITED STATES PATENTS

| | | | |
|---|---|---|---|
| 2,481,564 | 9/1949 | Bjorkman | 4—178 |
| 2,611,341 | 9/1952 | Paris | 128—66 X |
| 3,155,072 | 11/1964 | Owens | 128—66 X |

RICHARD A. GAUDET, *Primary Examiner.*

L. W. TRAPP, *Assistant Examiner.*